United States Patent [19]

Bloomfield

[11] 4,267,876

[45] May 19, 1981

[54] FILM FASTENING SYSTEM

[75] Inventor: Roger D. Bloomfield, Jackson, Wyo.

[73] Assignee: Park Fastener Company, Colorado Springs, Colo.

[21] Appl. No.: 100,549

[22] Filed: Dec. 5, 1979

Related U.S. Application Data

[63] Continuation of Ser. No. 950,998, Oct. 13, 1978, abandoned, which is a continuation-in-part of Ser. No. 792,660, May 2, 1977, abandoned.

[51] Int. Cl.³ ............................................ A47H 13/00
[52] U.S. Cl. ..................................... 160/392; 160/395
[58] Field of Search ............... 160/371, 372, 394, 395, 160/397

[56] References Cited

U.S. PATENT DOCUMENTS

| | | | |
|---|---|---|---|
| 2,526,912 | 10/1950 | Swanson | 160/392 |
| 3,805,873 | 4/1974 | Bloomfield | 160/392 |
| 3,893,212 | 7/1975 | Curry | 24/243 K |
| 3,987,835 | 10/1976 | Bloomfield | 160/392 |
| 3,999,258 | 12/1976 | Curry | 24/243 |

Primary Examiner—Peter M. Caun
Attorney, Agent, or Firm—Kinney, Lange, Braddock, Westman and Fairbairn

[57] ABSTRACT

A fastening system for attaching a flexible sheet or cover such as a polyethylene film sheet to a structure comprising a rigid channel which extends along the line where the sheet is to be fastened and attached to the structure, and a plastic lock strip that inserts into the channel and will retain the film relative to the channel. The plastic lock strip includes a spring means that will continuously urge the lock strip into a detent holding position with respect to the channel to insure that this film is held securely even under situations where there is little tension in the sheet or film. The features further include a pinching type detent that increases the holding force for any given tension in the plastic sheet.

13 Claims, 7 Drawing Figures

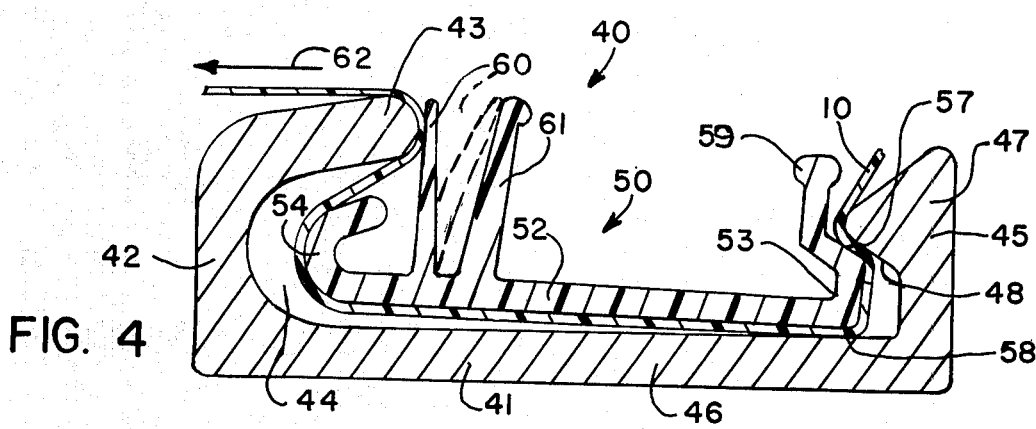
FIG. 4
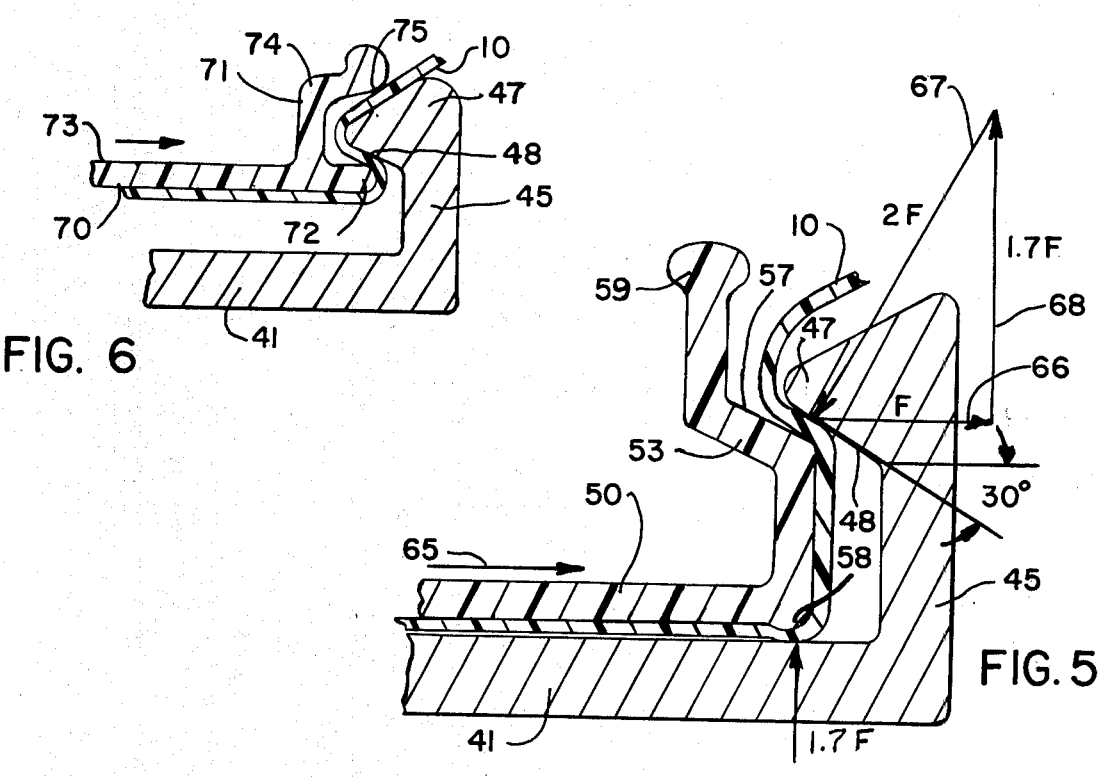
FIG. 6
FIG. 5
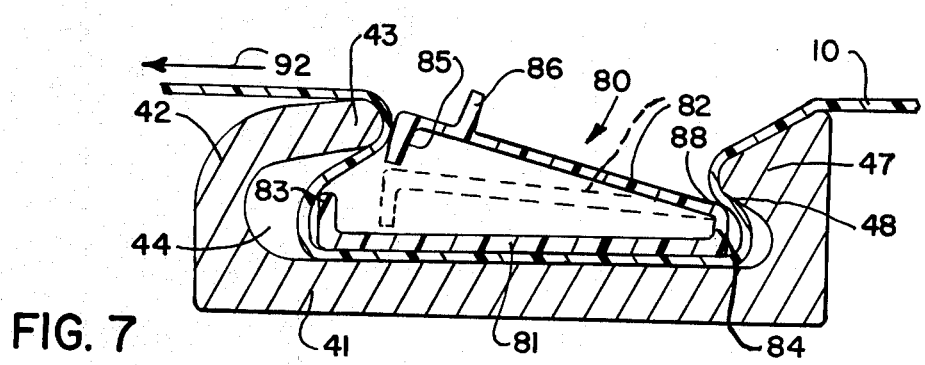
FIG. 7

FILM FASTENING SYSTEM

CROSS REFERENCE TO RELATED APPLICATION

This application is a continuation of my copending application Ser. No. 950,998, filed Oct. 13, 1978, which in turn was a continuation-in-part of my application Ser. No. 792,660, filed May 2, 1977 for FILM FASTENING SYSTEMS, both now abandoned.

BACKGROUND OF THE INVENTION

1. Field of the Invention

The present invention relates to locking devices for locking sheets or films with respect to fastening channels.

2. Prior Art

My U.S. Pat. No. 3,987,835 illustrates a type of fastener that is utilized for fastening sheets or continuous films to channels which in turn are attached to a structure to be covered. In certain instances where the tension in the material is relatively low, and where the sheet being held is relatively stiff, such as in a relatively stiff plastic film, the detent and bar will not rigidly interlock, and the fastener will permit the film to gradually work around the fastening bar and ultimately be released. U.S. Pat. No. 3,987,835 illustrates fasteners which work well in most applications, and the present device constitutes an improvement over that patent as well as my own prior U.S. Pat. No. 3,805,873.

Additionally, U.S. Pat. No. 3,893,212 illustrates a device for making a fastener for plastic film or the like which utilizes a plastic channel with a plastic insert strip, and a similar device to this patent is shown in U.S. Pat. No. 3,999,258.

It should be noted that the device shown in FIGS. 1 through 3 of this continuation-in-part application, and which device was described in application Ser. No. 792,660 mentioned above, has been in public use and on sale more than one year prior to the filing of this continuation-in-part application.

SUMMARY OF THE INVENTION

The present invention relates to a film fastening system using a channel member made of aluminum or other rigid material, which has a plastic insert lock bar or strip therein. The channel is made so that along one edge it has an overhanging lip or recessed surface, and at the other edge a detent cooperating with the insert bar to prevent one edge of the insert from slipping out of the recess portion at the other edge. To use the fastener, a flexible sheet is first positioned in the channel and under the insert bar, and the insert is then put into place in the channel. The insert can be inserted in the channel by placing one edge of the insert underneath the overhanging ledge in the channel, and pressing the detent portions on the opposite edge into the channel until they interlock.

In the present invention a spring element is utilized for constantly urging the detent portions between the channel and the insert to remain engaged even with low tensions in the sheet. In two forms of the invention the detenting surfaces provide a ramping action to increase the detent holding force available from the same lateral force of the lock bar.

It has been known that a sufficient tension load in a sheet that is being held by the lock channel member will cause the insert to slide and to be forced in direction so that the detent tightly interlocks when the sheet is under tension. With stiff plastic sheets, the sheet may tend to creep unless the detent portions are kept interlocked, and the present spring device prevents such creep.

As shown in FIGS. 4 through 7 the detenting holding force is improved by utilizing a pinching action, or by cooperating surface sections between the rigid channel and the locking bar or strip. The total retention force acting on the flexible film on the detent side can be increased by providing ramp surfaces between the locking strip and the rigid retaining channel. The sheet will be pinched under forces urging the ramp surfaces together. The pinching increases the force holding the film for a given load urging the lock strip toward the detent position.

Additionally, it has been found that in certain instances the pushing of the lock strip or bar into the recess of the channel against the upstanding spring element will cause the spring to bend a sufficient distance to overstress the spring and cause permanent deformation of the spring element. The spring effectiveness is thus eliminated or substantially reduced. The plastic material from which the spline or insert locking element is made will yield permanently. To avoid this unsatisfactory operation, a rib used for gripping when inserting or removing the lock strip or bar is positioned closely adjacent to the upright spring element and inclined away from the spring at an angle substantially fifteen degrees. When the locking element is pushed into position to insert it into the channel, or is otherwise forced back under the overhang on the side of the channel adjacent to the upright spring element of the lock strip, the spring will come to rest against the rib and be stopped. The bending of the upright spring element is controlled to a known amount to avoid permanent deformation and yielding of the spring.

In combination, therefore, the upright spring also will force the ramping detent surfaces together with a pinching action for improved holding ability when the sheet is under little or no tension load.

A variation shown includes a lock strip that provides initial spring force for detent and also ramps detent surfaces in a "safety pin" type of lock strip.

The various devices of the present invention shown can be made as simply as other devices, and with a variety of different types of springs and varied strips. A cantilever or a leaf type spring is shown, as well as the safety pin type lock strip, but other types of spring elements acting against one edge of the rigid channel to force the lock bar into its detent position on the opposite edge of the channel can be utilized.

BRIEF DESCRIPTION OF THE DRAWINGS

FIG. 4 is a transverse sectional view through an elongated channel and locking strip in a modified form of the invention;

FIG. 5 is an enlarged fragmentary sectional view of the detent portion of the device of FIG. 4 showing the pinching action of the detent;

FIG. 6 is a further modified fragmentary cross sectional view of an elongated locking strip and channel made according to the present invention; and FIG. 7 is a cross sectional view of a modified locking strip which has a different form of spring for initial holding of the unloaded sheet and which also incorporates the pinching detent action for improved holding.

DESCRIPTION OF THE PREFERRED EMBODIMENTS

Figure 1:
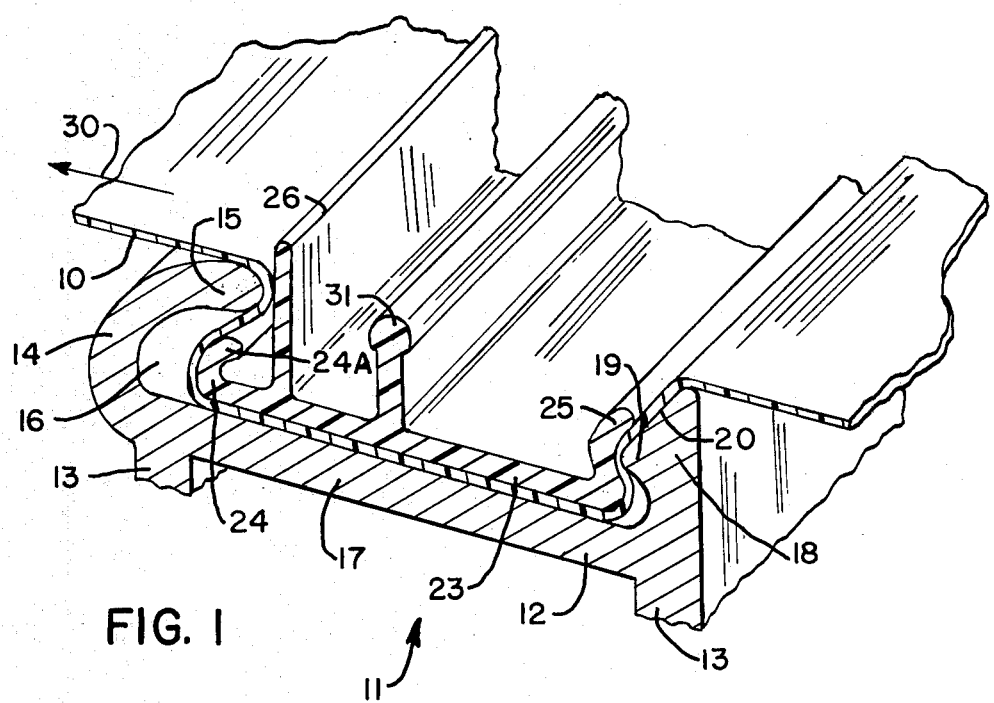
FIG. 1 is a fragmentary perspective view of a typical installation showing a fastening system of the present invention in use.
Figure 2:
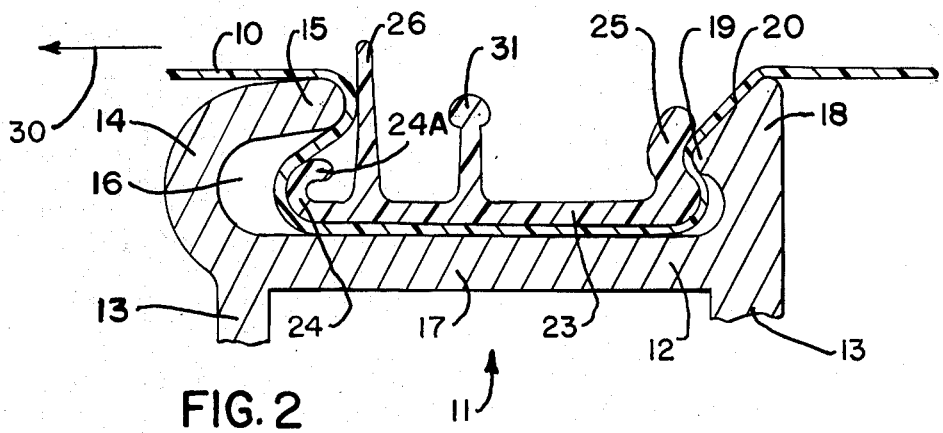
FIG. 2 is a sectional view of the locking system channel insert member of the present invention.
Figure 3:
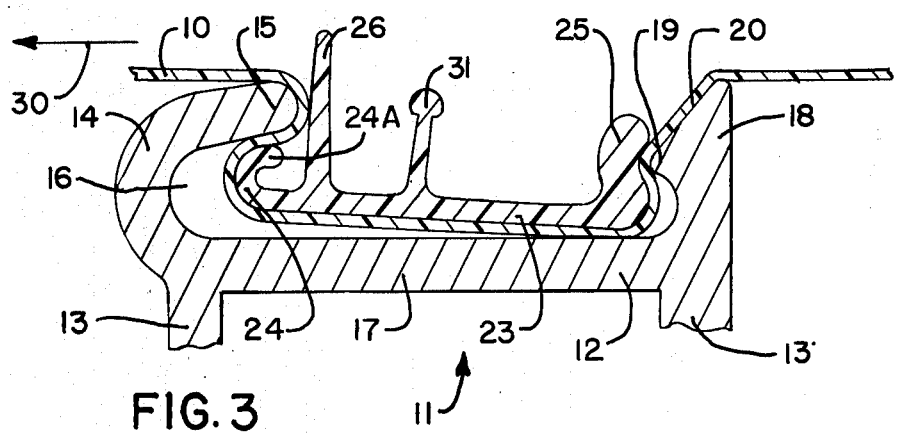
FIG. 3 is a fragmentary sectional view showing the locking system when the sheet being held is under tension.

Referring to FIGS. 1-3 of the drawings, a polyethylene or plastic film sheet indicated generally at 10 is the type of sheet that is to be held in a locking device which is indicated generally at 11. This locking device can be mounted along the edges of a structure that is to be covered, or it can be an intermediate fastener for holding the sheet in an intermediate position.

The locking device 11 includes a base channel 12 which is an extruded member made of aluminum or similar rigid material, and has suitable means indicated at 13 for fastening it to a structure on which the polyethylene film or sheet 10 is to be mounted. The channel member 12 has a first generally upright wall 14 adjacent one edge, and as shown the wall is curved over to form an overhanging ledge member having a rounded end 15, and a recessed portion 16 formed above the base wall 17 of the channel 12. A second upright wall 18 is attached to the opposite edge of the base wall 17 from the wall 14, and the wall 18 has an inwardly directed member 19 which forms a detent portion in relation to an insert bar for the lock channel that will be described. The upward facing surface 20 of the wall 18 can be used for "ramping" a locking member 23 into the channel over the sheet 10. The locking bar 23 is used to hold the sheet 10 in connection with the channel. The locking bar 23 as shown has a first edge portion 24 that is curved around to form an overhanging lip 24A, and this will fit into the recess 16 when the unit is being used.

The locking member 23 as shown is an elongated member that extends substantially coextensively with the longitudinal length of the channel 12, and at the opposite edge of the locking member from the edge portion 24, there is an upright detent member 25 which cooperates with the detent portion 19 to provide a pinching or locking action for the flexible sheet 10.

The locking member 23 includes a spring or biasing element 26 that extends uprightly from the main portion of the locking element 23, and is adjacent to the edge portion 24. This spring element 26 extends upwardly from the main portion of locking bar 24 so that it protrudes out of the channel 12, and above the rounded end portion 15 of the wall 14. The spring element 26 is resilient and as shown is positioned so that when the lock bar has been installed in Channel 12 with a plastic sheet 10 underneath the locking member, the spring element 26 will provide a spring or biasing pressure urging the detent wall 25 to engage the detent portion 19. In other words, the spring provides a detenting action initially and will cause the sheet 10 to be held by the detent action even with very little or no tension in the sheet. The tension in the sheet is in direction as indicated by the arrow 30. The arrow 30 indicates the normal direction of load. Note that the sheet 10 fits over the walls 18 and 14 and around the rounded edge 15 of wall 14. Under tension load, the sheet 10 will tend to slide around the rounded end 15, and in this way will lift up the locking member 23 and force it in direction so that the detent 25 wall is tightly forced against the edge or detent part 19 of wall 18 on the channel to tightly engage the sheet 10 with a force proportional to the tension in the sheet. This is shown in FIG. 3.

However, under low forces with a relatively stiff plastic sheet 10, the plastic may tend to creep because the lock bar would be under no load as shown in FIG. 2, and the force with which the detent wall 25 and the locking member engages the edge 19 is low, permitting this creep. The spring element 26, however, provides a force which will pinch the sheet and prevent the creep under low tensions of the sheet, and as the tensions increase of course the force tending to lock the sheet in place will increase as well.

A rib 31 can be provided and utilized for removing or replacing the locking strip 23.

The spring element 26 as shown is an upright or cantilevered type spring, but it could be any desired type that will exert a resilient force against the wall of the channel opposite from the detent portions to urge the locking bar or member 23 so that the detent portions interlock.

The locking member 23 as shown is wider than the space between the edge of the detent member 19 on the channel, and the edge of the wall 15, but it can be inserted by putting in the edge 24 first, so that the plastic sheet 10 and the edge 24 go underneath the overhanging ledge of wall 14 and rounded edge 15 into the recess 16, until the upright detent wall 25 will slip past the edge 19. Then, the tension from the spring 26 will urge the detent wall portions together, to pinch the sheet 10 and prevent it from slipping out. The spring 26 urges the detent portions into engagement, as previously explained. The overhanging member 24A on the locking bar is provided so that when the sheet is under tension, as shown in FIG. 3, the edge 15 of the channel does not engage the spring 26 near its base. This avoids overstressing the spring when the sheet 10 is under high tension loads and the lock element is raised as shown in FIG. 3.

As stated previously, the spring means or bias means 26 that urges the detent members into engagement regardless of the tension in the sheet is made so that the spring element will engage one edge of the channel and urge the locking member toward the detent edge of the channel. The spring element can be modified and fastened to the base portion of the locking member 23, or could extend from the wall 25 all the way across the channel, or could be fastened intermediate the edges of the locking member 23. Additionally, a foam insert for example could be used for urging the locking member detent wall 25 against the detent edge 19 of the channel.

Additionally, it is possible to mold the main portions of the locking member 23 with relatively rigid material while having the spring member 26 of a different durometer elastomer to provide a different spring rate.

Referring to FIGS. 4 and 5, a modified form of the channel and the lock strip (or spline) is shown. The primary differences from the first form include a stop to prevent overstressing and deformation of the upright spring element provided and an improved detenting action through "pinching" of the sheet along ramping surfaces.

A plastic film or sheet 10 as in the previous form of the invention is nested into a locking device of the modified form indicated generally at 40, and this modified locking device can be provided in any desired location to hold a sheet of polyethylene or other plastic in position. A base channel 41 is provided, and this is generally of extruded aluminum or similar rigid material, and is elongated as desired. The channel has suitable means for fastening it to a structure, such as screws which are not shown. The base channel 41 has a base wall 46 and a side wall indicated at 42 at the left side thereof that extends upwardly and includes an overhanging ledge member having a rounded end portion 43. The wall 42 and end portion 43 form a recess 44 as shown, along the left side of the channel as shown in FIG. 4 with respect to base wall 46. A second upright wall 45 is provided along the opposite side of the base wall 46 from wall 42 and as shown, the wall 45 has a detent rib 47 at the upper end which is directed inwardly, that is toward wall 42.

The detent rib 47 extends along the length of the elongated channel member 41, and as shown the rib forms an overhanging surface 48 which is inclined with respect to the plane of the base wall 46 at a desired included angle as shown thirty degrees. As will be more fully explained, this will provide a pinching action for holding the polyethylene sheet 10 in position.

As in the previous form of the invention, the upwardly facing surface of detent rib 47 is used for "ramping" in the locking strip or bar member 50 which is used in connection with the channel for retaining the polyethylene sheet in position. The locking strip 50 as shown is similar to the locking strip 23 of the first form of the invention, and has a first edge portion 54 that is rolled over and is of substantially less height than the recess 44 into which it fits. As shown, the locking strip 50 is elongated and extends substantially coextensively with the longitudinal length of the channel 41. The locking strip has a generally flat, fairly rigid, extruded plastic (elastomeric) base wall 52 and in this form of the invention, along the opposite edge of the locking strip or bar (also referred to as spline) from edge portion 54 there is a detent wall indicated generally at 53 which fits underneath the detent rib 47. The wall 53 extends upwardly and has an upper edge surface that faces outwardly and upwardly and interferes with the surface 48 prior to the time that the wall portion 53 engages and rests against the inner surface of the upright wall 45 of the channel during detenting action. The strip 50 is an extruded elastomer or plastic that is fairly rigid, so that wall portion 53 will not bend easily nor compress downwardly toward the base wall 52 when the upper surface 57 of this wall portion 53 engages the ramping surface 48 of the detent portion 47. As the surface 55 engages the surface 48 it tends to pinch the sheet 10 between the surface portions. The surface 48 forms a ramp that urges the wall 53 down toward base 46 of the channel. The wall portion 53 may have an upper rib 59 that is used for ease of gripping when removing or replacing the lock strip relative to the channel 41.

As in the previous form of the invention, the base wall 52 of the lock strip has an upright cantilevered spring member 60 formed integrally therewith which engages the rounded end portion 43 of the channel when the lock strip is in place holding a sheet 10 within the channel. This spring 60 is resilient enough to exert a force tending to push the surfaces 57 and 48 together to tend to pinch the sheet 10. It should be noted that the lock strip or bar can be extruded sufficiently accurately so that the distance between the lower edge surface at the base of wall portion 53, and which is indicated at 58, (which can be found as a rib offset from the balance of the bottom surface), to the surface 57 can be sufficient to permit pinching of a 4 mil thick polyethylene sheet for example. The spacing of the surface 48 relative to the upper surface of the channel base wall 46 may also be controlled to insure proper fitting of the surfaces.

An upright rib 61 is provided adjacent to the spring 60, and in this form of the invention is positioned so that the rib will act as a backstop for the spring 60 and prevent it from being overstressed. Overstress and yielding of the material sufficiently to cause permanent deformation can occur in situations where the end wall 54 of the lock strip is slid inwardly completely below the recess 44 to insert the locking member 50 into the channel. The spring 60 will bend as shown in dotted lines in this form of the invention, but the rib will limit the bending to a position which does not result in permanent deformation and failure of the spring. The upright rib 61 acts as a reinforcing and can be made substantially heavier and less flexible or less springy than the upright spring elements 60. The spring is permitted to bend about fifteen degrees as shown.

The upright spring element 60 fulfills the same function as described in the previous form of the invention, namely providing a spring load to urge the surfaces 48 and 57 together to tend to retain the sheet 10 when there is not sufficient tension load on the sheet 10 in direction as indicated by the arrow 62 to force the detent surfaces together. It should be noted that load in direction of the arrow 62 does transfer tension around the rounded end 43 to tend to urge the wall 53 of the locking strip underneath the detent rib 47.

Referring to FIG. 5, an illustration of the forces involved in the detent pinching action is provided. The detent action illustrated is shown with a thirty degree inclination of the surface 48, and with a force in the direction of arrow 62 on the sheet which results in a force "F" in direction as indicated by the arrow 65 in FIG. 5. This force F will tend to urge the lock strip toward the upright wall 45. In a normal detenting action shown in the first form of the invention, the detent force would be F, in that the detenting took place on rounded mating surfaces on members 19 and 25 which directly reacted the lateral force of the strip, as shown in FIGS. 1 through 3. The lock strip is made of material that is rigid enough to react this force against the detent. In the form of the invention shown in FIGS. 4 and 5, because of the ramp surface 48 and line contact of surface 57, force F may be shown as a vector indicated at 66. Because of the inclination of surface 48 (thirty degrees) the vector is perpendicular to the surface as indicated by the vector 67 and its magnitude is 2F. Also, there would be a downward reaction of 1.7F as shown by the vector 68. The vector 68 is reacted against base 46 of the channel, and then the fit of wall portion 53 must be proper.

This ramp action provides detent lines in two locations. A pinching action against the sheet 10 occurs along the line where surfaces 48 and 57 mate with a force indicated by vector 67, and further a pinching action occurs between the lower edge of the lock bar member 50 at point 58 and the upper surface of the channel base wall 46. This force is substantially equal to vector 68. Because the pinching action is along two separate lines, the total pinching force is additive and comprises a retaining force of about 3.7F. In figuring the retention force, where the coefficient of friction of the flexible film is represented by "u", the total retention force would therefore be 3.7uF, whereas in the previous forms of the invention, the retention force would be only uF. The friction between the mating parts would decrease the actual detent force from the theoretcial, of course. In actual practice, it has also been noted that the tension in the sheet 10 which would be represented by the arrow 62, results in a force "F" which is slightly less than the actual tension.

The included angle of the surface 48 with respect to the plane of the base wall 46 of channel 41 generally would range between minimum of 10°, up to a maximum of about 445° to achieve the desired pinching action. It is necessary that the ramping surface does not become self locking, that is, the angles must not be so low so that it would be difficult or impossible to remove the lock strip from the channel when it was under slight loads. Note that a small rib may be made at location 58 to insure line contact for detent action.

In FIG. 6, a further modified form of the invention is shown. In this form of the invention, the channel 41 has a detent rib 47, with an inclined detent surface 48 for locking purposes. However, the lock strip or bar 70 has a detent wall 71 of a different configuration. The lock strip 70 would be constructed as strip 50 on the left hand side and would include spring 60 and wall portion 54. As shown, the detent wall 71 has a first longitudinally extending rib 72 which is substantially the same height as the main base wall 73 of the strip. The detent wall 71 also has an upright curved wall portion 74 that together with the portion 72 forms a pocket of size to receive the end of the detent rib 47. It can be seen that the upper surface of the member 72 will engage the surface 48 and the ramping action will occur from detent forces acting in direction of the arrow shown. At the same time, the outer end portion 75 of the wall portion 74 will be forced down against the upper surface of the rib 47, resulting in substantially the same relationship of pinching action as that shown in FIGS. 4 and 5. Instead of having the pinching action at the lower surface of the lock bar member, a pinching action takes place between the surface 48 and the rib 72 of the lock strip, and between the upper surface of the rib 47 and the end portion 75 of the detent wall 74.

The material from which the lock bar 70 is formed has to be sufficiently rigid to react the pinching loads that are involved, but is preferably an extruded plastic (elastomeric) member.

In FIG. 7, a further modified form of the invention is illustrated. In this form the channel member 41 is again a rigid channel having a detent rib 47 with a ramping surface 48 thereon, and is designed to hold a flexible plastic sheet 10 as in the previous forms of the invention. The channel has the overhanging end portion 43 of wall 42 forming a recess 44 as shown.

The lock strip or bar illustrated at 80 forms a variation of the lock strips shown previously. The lock strip 80 does provide initial holding force and pinching action for detent at surface 47, and at the bottom edge of the lock strip 80. The lock strip 80 is elongated in the longitudinal direction of the channel 41, and is molded so that it forms a cross section suggestive of a safety pin. However, it is molded of a plastic that is semiresilient and while capable of bending, the lock strip tends to return to its position shown in FIG. 7 whenever it is at rest.

The lock strip or bar includes a base wall 81, and an upper spring wall 82. The base wall has an upright edge wall 83 provided at the left thereof which nests in the recess 44 under the rounded end portion 43 of the channel. The wall 82 is joined to the wall 81 through an upright end wall 84 that is relatively low, and is made so that it will fit underneath the surface 48 to a sufficient degree to provide the pinching action as illustrated in FIG. 7. The entire lock strip can be extruded as a unit. The free end of the wall 82, however, has a downwardly depending lip 85, and this lip 85 is positioned so that when the lock strip 80 is in its normal position in channel 41 as shown in FIG. 7, the lip 85 aligns with the rounded outer surface of the end portion 43 of the wall 42 of the channel. A rib 86 may be provided on the wall 82 for gripping and aid in insertion.

The wall 82 is resiliently loaded upwardly and when in position the lip 85 is resiliently urged to position shown in FIG. 7. This action urges end wall 84 underneath the detent rib 47, and at the same time tends to pinch the sheet 10 against the upper surface of the wall 82 adjacent this corner where it joins wall 84 and which is indicated at 88. When the lip 85 is in position shown in FIG. 7, the lock strip is held with the sheet 10 pinched and detented even with little or no tension in the sheet. The normal direction of tension is indicated by the arrow 92. When tension is in the sheet as indicated by arrow 92, the sheet 10 tends to slide around the rounded end 43, causing a force urging the entire lock strip 80 underneath the detent wall 47 and pinching the sheet edge or corner 88 of the lock strip and the surface 48 of the channel.

When the lock strip is to be removed or installed, wall 82 is depressed downwardly to its dotted line position. Lip 85 is moved down against the upper surface of the base wall 81. Then the entire lock strip can slide back into the receptacle 44 (the wall 82 will slide under the wall portion 43) so that the end wall 84 will move past the rib 47 of the channel 41 and will slip under the surface 48. The upper surface of rib 47 also acts as a ramp for insertion. The detenting still may be a relatively shallow detent, and can be relatively easily disengaged, but high pinching force is achieved by the use of the ramping detent surfaces that increase the available force with a given tension in the sheet.

The wall 82 will spring back up whenever the wall 84 is seated properly under rib 47, and the lock strip will hold the sheet 10 in position in the channel even when there is no force or tension in the sheet itself.

Further, it can be noted that there is a detenting action that occurs between the end of the wall portion 43 of the channel and the lip 85 if the tension in the sheet was reversed from that shown in arrow 92 and the tension was to the right in FIG. 7. This would provide a reaction force around the rounded end of the rib 47 to tend to urge the lock strip 80 toward the wall 42 and provide a pinching or detenting action between the lip 85 and the outer edge of wall portion 43. Thus the lock bar 80 tends to provide a retaining force in both directions of tension on the sheet.

It should be noted that in each of the embodiments where the pinching and detent action occurs, there is no contact of surfaces of the lock strip and channel which directly oppose forces parallel to the channel base. In other words, the resistance to sliding of the lock strip or bar parallel to the channel base wall is along ramping surfaces where the pinching occurs. The direct reaction force is not parallel to the plane of the base of the channel. The locking bar is thus not directly restrained from moving in a direction generally parallel to the base of the channel.

It also should be noted that the wall 82 provides a fairly high force against separation of the detents, but as the wall tends to move upwardly the lip acts against the rounded surface of the end portion 43 of the channel and thus it acts to resiliently urge the detent into engagement. The wall 82 also is resilient and will bow for spring action.

The lock member 80 is shown in the drawings as a plastic extrusion, but could be produced in metal as an extrusion or formed shape.

What is claimed is:

1. An apparatus for holding a flexible sheet of material in place comprising in combination an elongated substantially rigid channel member having a base wall and a pair of side walls extending generally parallel to each other and along the longitudinal length of said base wall, at least one of said side walls forming an overhanging ledge above and spaced from the base wall, an elongated flat relatively rigid locking strip having a width substantially greater than its height and having a pair of longitudinally extending edge portions which define the width thereof, the height of said locking strip being substantially less than the height of said channel side walls, a first edge portion of said locking strip being removably positionable under said overhanging side wall of said channel, and the second edge portion of said locking strip including a wall portion extending outwardly from said locking strip and having portions engaging a second side wall of said channel to form detent means tending to resist removal of said lock strip, and a cantilevered spring element fixed to said flat locking strip and spaced from said wall portion thereof and engaging a portion of said overhanging ledge of said channel and urging said wall portion of said strip to engage the second wall of said channel under a resilient force when the locking strip is in place in said channel adjacent the base of said channel.

2. The combination as specified in claim 1 and an associated flexible sheet of material positioned between said locking strip and said channel, a normal direction of tension in said sheet of material being such that the sheet of material tends to be pulled away from said overhanging wall and the tension in the sheet of material forces said locking strip in direction to more tightly engage said detent means as the tension in the sheet of material increases.

3. The combination as specified in claim 1 wherein said first edge portion of said strip comprises a wall formed by rolling over said flat bar along the first edge portion and forming means to prevent the lock strip from being lifted upwardly from the base of the channel under the overhanging ledge more than a desired amount.

4. The combination of claim 1 wherein said second side wall of said channel member includes a rib, said rib including a surface facing the base wall of said channel member which is inclined at an angle relative to the base wall and forms a ramp-like surface facing the base wall, said wall portion of said second edge portion of said locking strip having a detent surface which engages said ramp-like surface prior to the time that the locking strip is fully seated against movement parallel to the base wall of said channel member in direction toward said rib, said ramp surface and a first part of said detent surface of said locking strip engaging and tending thereby to pinch a sheet of material positioned therebetween and to force said locking strip toward the base wall of said channel under action of said ramp surface, and a second portion of said locking strip reacting the pinch force against a portion of said channel member spaced from said ramp-like surface.

5. The combination as specified in claim 1 and a rib extending outwardly from the base of said locking strip and positioned adjacent said spring element to permit limited deflection of the upper portions of said spring element and to provide a stop for said spring element to prevent excessive deflection as the first edge portion of the locking strip is inserted beneath said overhanging ledge.

6. An apparatus for holding a flexible sheet of material in place comprising in combination an elongated substantially rigid channel member having a base wall and first and second side walls extending generally parallel to each other and along the longitudinal length of said base wall, a first of said side walls forming an overhanging ledge spaced from the base wall, an elongated relatively rigid flat locking strip having a pair of longitudinally extending edge portions, said strip being substantially less in height than the height of the side walls of said channel, a first edge portion of said flat strip being of size to fit between the base and said overhanging ledge of the first side wall of said channel, and a second edge portion of said strip comprising an outwardly extending wall portion including a surface engaging the second side wall of said channel to form a detent and to releasably retain said first edge portion between said ledge and said base wall, and spring means formed integral with said locking strip and extending outwardly from said strip and spaced from the said first edge portion thereof sufficiently to permit the first edge portion to fit under the overhanging ledge, said spring means extending outwardly from said strip sufficiently far to engage the edge of the overhanging ledge of the first side wall of said channel under a resilient force and to urge said second edge portion including the wall portion of said strip toward said second wall of said channel to engage the detent under a positive force whenever the locking strip is in place in said channel adjacent the base thereof.

7. The combination of claim 6 wherein said second side wall of said channel member includes a rib, said rib including a surface facing the base wall of said channel member which is included at an angle relative to the base wall and forms a ramp-like surface facing the base wall, said outwardly extending wall of said second edge portion of said strip having a detent surface which engages said ramp-like surface prior to the time that the locking strip is fully seated against movement parallel to the base wall of said channel member in direction toward said rib, said ramp surface and a first part of said detent surface of said locking strip engaging and tending thereby to pinch a sheet of material positioned therebetween and to force said locking strip toward the base wall of said channel member under action of said ramp surface, and portions of said locking strip adjacent said detent surface reacting the pinching force against a portion of said channel spaced from said ramp-like surface.

8. The combination as specified in claim 6 wherein said spring means comprises a wall member mounted on said lock strip adjacent the second edge portion of said locking strip and overlying portions of said strip, said wall member being resiliently urged to a position raised upwardly from the strip adjacent the first side wall of the channel to engage the edge of said overhanging ledge.

9. The combination as specified in claim 6 wherein said sheet of material comprises an associated plastic film positioned between said locking strip and said channel, the normal direction of tension in said plastic film being such that it extends away from said overhanging ledge and transfers the tension in the film to force said locking strip in direction to more tightly detent as the tension increases.

10. A device for retaining sheets of material comprising a substantially rigid channel member having a base wall and a pair of side walls extending generally parallel to each other along the longitudinal length of said base wall, and being spaced apart to define an opening facing away from said base wall, means on a first of said side walls forming an overhanging ledge spaced from the base wall, and means on the second of said side walls forming a detent rib which is also spaced from the base wall, said detent rib having a surface facing said base wall which is inclined at an angle relative to said base wall and forms a ramp-like surface facing the base wall, a lock strip having a width substantially greater than its height and being of a width less than the width of the space between the channel side walls adjacent the base wall so that it will fit between said side walls with at least portions thereof below the overhanging ledge and also below the detent rib, and said lock strip overlying a sheet of material to be held spanning said channel when positioned in said channel, said lock strip including a wall portion having a surface which engages said ramp-like surface of said detent rib prior to the time that the lock strip is fully seated against movement parallel to the base wall of said channel and in direction toward said detent rib, said ramp-like surface and a first part of said wall portion of said lock strip engaging and tending to thereby pinch a sheet positioned therebetween and to force said lock strip toward the base wall under the action of said ramp-like surface, and a second wall portion of said lock strip supporting said lock strip and reacting the force tending to move said lock strip toward the base wall of said channel.

11. The combination of claim 10 wherein said lock strip comprises a strip having a flat base wall including a first edge portion which fits below the overhanging ledge when the first part of said wall portion of said lock strip engages the ramping surface, and a second wall, means mounting said second wall to said flat base wall adjacent said first part of said wall portion, said second wall being resiliently urged to a position spaced from said flat base wall, said second wall portion extending from the means mounting toward said overhanging ledge and having a lip that engages the edge of said overhanging ledge facing toward said rib to tend to hold the first part in engagement with said ramping surface, said second wall being movable toward said flat base wall sufficiently to permit said second wall to slide to position under said overhanging ledge.

12. A device for retaining sheets of material in which tension is placed, comprising a substantially rigid channel member having a base wall and a pair of side walls extending generally parallel to each other along the longitudinal length of said base wall, and being spaced apart to define an opening facing away from said base wall, means on a first of said side walls forming an overhanging ledge spaced from the base wall, and means on the second of said side walls forming a detent rib which is also spaced from the base wall, said detent rib having a ramp surface spaced from and included facing said base wall and inclined at an angle in the range of 30° relative to said base wall, said ramp surface facing the base wall, a lock strip having a width less than the width between the channel side walls and having first and second edge portions, the first edge portion fitting below the overhanging ledge and a second edge portion fitting below the portions of the ramp surface adjacent the channel opening but the second edge portion engaging the ramp surface when forces tend to move the lock strip toward the second side wall, the engagement between the second edge portion and the ramp surface forming a detent engagement of the lock strip and the channel, said lock strip overlying a sheet of material to be held spanning said channel when positioned in said channel, said overhanging ledge having a rounded edge surface which permits tension in said sheet to be transferred to the lock strip and force the lock strip toward the detent rib, said ramp surface and said second edge portion of said lock strip engaging each other and tending to thereby pinch a sheet positioned therebetween and to force said lock strip to engage the base wall of the channel and pinch the sheet under action of said ramp surface.

13. An apparatus for holding a flexible sheet of material in place comprising in combination an elongated substantially rigid channel member having a base wall and first and second side walls extending generally parallel to each other and along the longitudinal length of said base wall, a first of said side walls froming an overhanging ledge spaced from the base wall, an elongated relatively rigid flat locking strip having a pair of longitudinally extending edge portions, major portions of said strip being substantially less in height than the height of the side walls of said channel, a first edge portion of said flat strip being of size to fit between the base and said overhanging ledge of the first side wall of said channel, and a second edge portion of said strip comprising an outwardly extending wall portion including a surface engaging the second side wall of said channel to form a detent and to releasably retain said first edge portion between said ledge and said base wall, and spring means integrally formed as part of said locking strip, said spring means comprising a flat element extending along the length of said flat strip and being resiliently coupled to said flat strip and extending outwardly of the channel with the first edge portion at least partially under said ledge, the flat element resiliently engaging the edge of said overhanging ledge and resiliently urging the second end portion of said strip toward the second wall of the channel to engage the detent under positive force whenever the locking strip is in place in said channel adjacent the base thereof.

* * * * *

UNITED STATES PATENT OFFICE
CERTIFICATE OF CORRECTION

Patent No. 4,267,876  Dated May 19, 1981

Inventor(s) Roger D. Bloomfield

It is certified that error appears in the above-identified patent and that said Letters Patent are hereby corrected as shown below:

Column 12, line 5, (Claim 12, line 11), after "and" delete --included--; Column 12, line 6, (Claim 12, line 12), after "an" insert --included--; Column 12, line 35, (Claim 13, line 6), "froming" should be --forming--.

Signed and Sealed this

Twenty-fifth Day of August 1981

[SEAL]

Attest:

Attesting Officer

GERALD J. MOSSINGHOFF

Commissioner of Patents and Trademarks